(12) United States Patent
Cheng (10) Patent No.: US 9,917,981 B2
(45) Date of Patent: Mar. 13, 2018

(54) IMAGE PROCESSING APPARATUS

(71) Applicant: BROTHER KOGYO KABUSHIKI KAISHA, Nagoya-shi, Aichi-ken (JP)

(72) Inventor: Fei Cheng, Nagoya (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 0 days.

(21) Appl. No.: 14/632,681

(22) Filed: Feb. 26, 2015

(65) Prior Publication Data
US 2015/0244899 A1 Aug. 27, 2015

(30) Foreign Application Priority Data
Feb. 27, 2014 (JP) .................. 2014-037263

(51) Int. Cl.
*G06K 15/02* (2006.01)
*H04N 7/16* (2011.01)
(Continued)

(52) U.S. Cl.
CPC ....... *H04N 1/32673* (2013.01); *H04N 1/3263* (2013.01); *H04N 1/32358* (2013.01);
(Continued)

(58) Field of Classification Search
CPC ...... G06F 3/121; G06F 3/1285; G06F 3/1222; G06F 3/1238; G06F 3/1267;
(Continued)

(56) References Cited

U.S. PATENT DOCUMENTS

| | | | | |
|---|---|---|---|---|
| 2002/0171864 A1* | 11/2002 | Sesek | ................. | G06F 3/1205 358/1.15 |
| 2005/0100378 A1* | 5/2005 | Kimura | ................. | G06F 3/1222 400/76 |

(Continued)

FOREIGN PATENT DOCUMENTS

| | | |
|---|---|---|
| JP | 6-315061 A | 11/1994 |
| JP | 2002-321429 A | 11/2002 |

(Continued)

OTHER PUBLICATIONS

Notice of Reasons for Rejection of Japanese Patent Application No. 2014-037263, dated Feb. 14, 2017, which corresponds to this U.S. patent application. A partial human English translation is attached.
(Continued)

*Primary Examiner* — Chad Dickerson
(74) *Attorney, Agent, or Firm* — Merchant & Gould P.C.

(57) ABSTRACT

An image processing apparatus includes: an image processing unit; an authentication-information input unit; a storage unit; and a controller. The storage unit stores a plurality of secure jobs and a plurality of authentication information associated with the secure jobs respectively. The controller is configured to: acquire first authentication information; in a case that the first authentication information matches an authentication information stored in the storage unit, cause the image processing unit to execute a secure job stored in the storage unit and associated with the authentication information; acquire second authentication information which has been inputted during an interruption of the secure job; and in a case that the second authentication information matches another authentication information, and that another secure job associated with the another authentication information is executable by the image processing unit,
(Continued)

cause the image processing unit to execute the another secure job.

6 Claims, 9 Drawing Sheets

(51) Int. Cl.
*G06F 3/12* (2006.01)
*H04N 1/32* (2006.01)
*H04N 1/44* (2006.01)
*H04N 1/40* (2006.01)

(52) U.S. Cl.
CPC ......... *H04N 1/32678* (2013.01); *H04N 1/444* (2013.01); *H04N 1/4433* (2013.01); *H04N 2201/0094* (2013.01); *H04N 2201/218* (2013.01)

(58) Field of Classification Search
CPC .... G06F 3/1234; G06F 3/1203; G06F 3/1206; G06F 3/1247; G06F 3/1253; G06F 3/126; G06F 3/1288; G06F 3/1296; G06F 21/608; G06F 21/34; G06F 21/629; G06F 21/84; G06F 11/3055; G06F 17/30569; G06F 2216/17; H04N 1/0057; H04N 1/00708; H04N 1/00782; H04N 1/32358; H04N 1/3263; H04N 1/32673; H04N 1/32678; H04N 1/4433; H04N 1/444; H04N 2201/0094; H04N 2201/218
USPC ......... 358/1.1, 1.9, 2.1, 1.11–1.18, 400–404; 718/182, 183; 726/2–5, 16–21, 26–33
See application file for complete search history.

(56) References Cited

U.S. PATENT DOCUMENTS

| | | | |
|---|---|---|---|
| 2005/0179933 A1 | 8/2005 | Akao | |
| 2006/0092453 A1* | 5/2006 | Okada | H04N 1/00411 358/1.14 |
| 2007/0127053 A1* | 6/2007 | Tominaga | G06F 3/121 358/1.14 |
| 2008/0304104 A1* | 12/2008 | Hirama | G06F 21/608 358/1.15 |
| 2014/0340702 A1* | 11/2014 | Maki | G06F 3/1285 358/1.14 |

FOREIGN PATENT DOCUMENTS

| | | | |
|---|---|---|---|
| JP | 2004-98413 A | | 4/2004 |
| JP | 2004098413 A | * | 4/2004 |
| JP | 2004-175043 A | | 6/2004 |
| JP | 2005-161841 A | | 6/2005 |
| JP | 2005-236357 A | | 9/2005 |
| JP | 2007-050628 A | | 3/2007 |
| JP | 2007050628 A | * | 3/2007 |
| JP | 2007-158571 A | | 6/2007 |
| JP | 2007158571 A | * | 6/2007 |
| JP | 2009-039936 A | | 2/2009 |
| JP | 2010-125664 A | | 6/2010 |

OTHER PUBLICATIONS

Notice of Reasons for Rejection of Japanese Patent Application No. 2014-037263 which corresponds to this U.S. patent application. A partial human English translation is attached.

* cited by examiner

IMAGE PROCESSING APPARATUS

CROSS REFERENCE TO RELATED APPLICATION

The present application claims priority from Japanese Patent Application No. 2014-037263, filed on Feb. 27, 2014, the disclosure of which is incorporated herein by reference in its entirety.

BACKGROUND

Field of the Invention

The present invention relates to an image processing apparatus which carries out processing of a secure job.

Description of the Related Art

In a conventional image processing apparatus, in a case that the secure job is suspended due to a reason such as jamming of paper or running-out of paper during the execution of the secure job, even if the jamming of paper or running-out of paper has been resolved, that secure job is not restarted unless the password of the secure job is re-inputted from the operation panel of the image processing apparatus. For such reason, in a case that another user has resolved the jamming of paper or the running-out of paper while a user who has made a request for that secure job is away from the image processing apparatus, it is possible to prevent the secure job from being restarted, and contents of the secure job from being known to the another user.

SUMMARY

However, in the conventional image processing apparatus, the secure job is not restarted unless the user who has made a request for the secure job inputs once again the password associated with that secure job from the operation panel of the image processing apparatus. Therefore, even if the another user resolves the jamming of paper or running-out of paper, it is not possible to execute that secure job.

An object of the present teaching is to provide an image processing apparatus which is capable of executing another secure job which is different from a secure job that has been suspended, in a case that the execution of the secure job has been suspended, and in a case that the another secure job is authenticated and executable.

According to an aspect of the present teaching, there is provided an image processing apparatus including: an image processing unit configured to execute image processing; an authentication-information input unit configured to receive an input of authentication information; a storage unit; and a controller, wherein the storage unit is configured to store a plurality of secure jobs, which are classified and to be executed by the image processing unit, and a plurality of authentication information associated with the secure jobs respectively, and the controller is configured to: acquire first authentication information inputted to the authentication-information input unit; in a case that the first authentication information matches an authentication information stored in the storage unit, cause the image processing unit to execute a secure job stored in the storage unit and associated with the authentication information; acquire second authentication information, which has been inputted to the authentication-information input unit during an interruption of the secure job due to an interruption reason; and in a case that the second authentication information matches another authentication information stored in the storage unit, and that another secure job stored in the storage unit and associated with the another authentication information is executable by the image processing unit, keep the interruption of the secure job which has been interrupted and cause the image processing unit to execute the another secure job.

According to such arrangement, in a case that the execution of the secure job has been interrupted due to the interruption reason, the second authentication information is acquired. Moreover, in a case that the second authentication information matches the another authentication information associated with the another secure job, and the another secure job is executable irrespective of the interruption reason, it is possible to execute the another secure job by the image processing unit.

DETAILED DESCRIPTION OF THE EMBODIMENTS

Exemplary embodiments of the present teaching will be described below in detail while referring to the accompanying diagrams.

<Mechanical Configuration>

Figure 1:
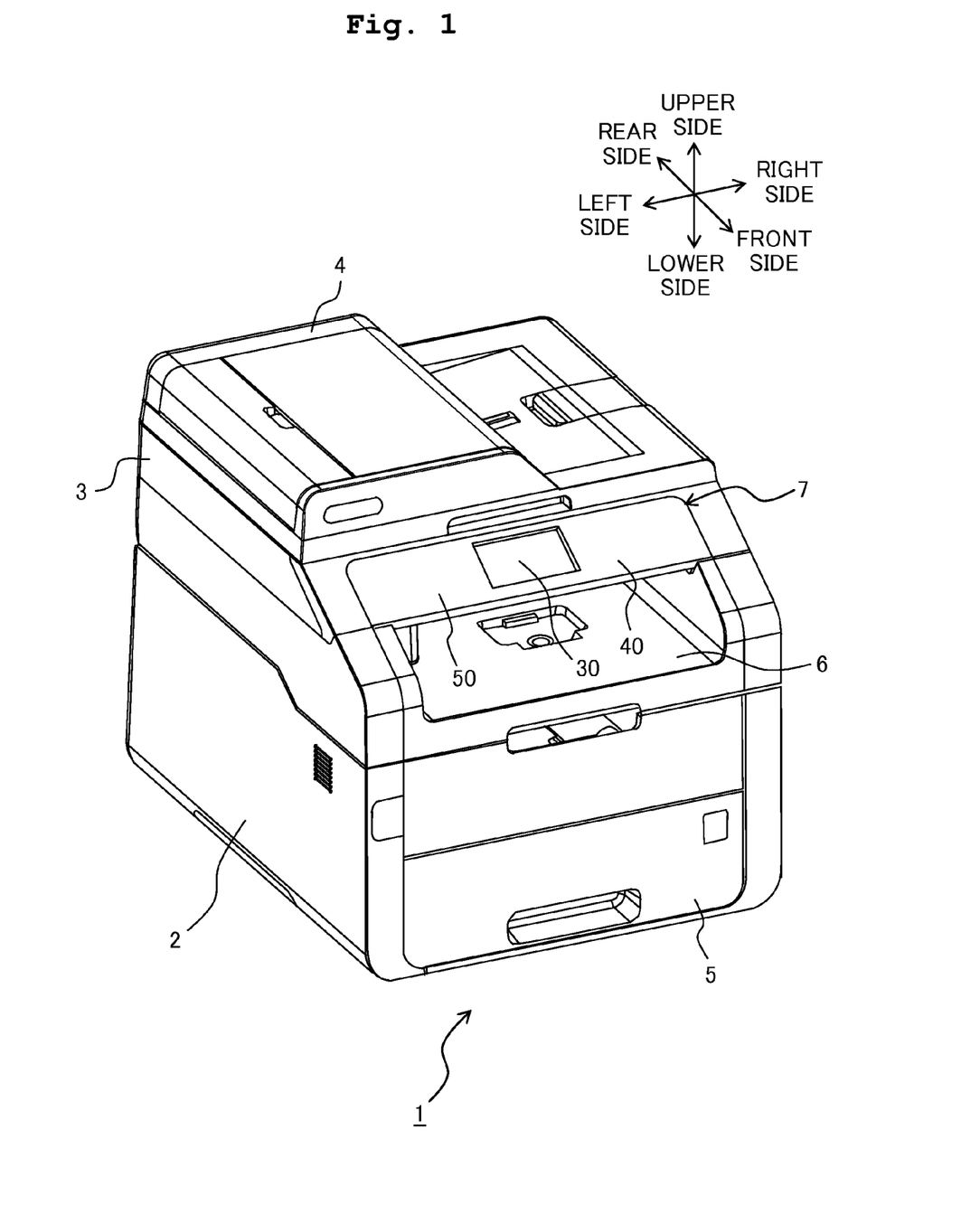
FIG. 1 is a perspective view of an MFP according an embodiment of the present teaching.

A MFP (multi-function peripheral) 1 as an example of an image processing apparatus includes a printer main-body 2, a scanner main body 3, and an ADF (auto document feeder) 4 as depicted in FIG. 1.

In the following description, an up-down direction is defined with reference to a state in which the MFP 1 is placed to be operable, a front-rear direction is defined with a side of the MFP 1 on which an operation panel 7 (described later on) is provided as a front side of the MFP 1, and a left-right direction is defined with reference to a view from the front side of the MFP 1.

An image forming unit 10 (refer to FIG. 2) is accommodated inside the printer main body 2. The image forming unit 10 carries out printing based on image data (color printing or black-and-white printing), and forms an image on a paper. The method for image formation may be an electrophotography method or an ink jet method. In the electrophotography method, an image is formed on a paper by transferring and fixing a toner image on to a paper. In the ink jet method, an image is formed on a paper by jetting fine ink droplets directly onto a paper.

A paper feeding tray 5 is provided to a lowermost portion of the printer main body 2. The paper feeding tray 5 (an example of a paper accommodating unit or a first paper accommodating unit) is configured to accommodate a plurality of papers in a stacked state. A paper discharge tray 6 is formed on an upper surface of the printer main body 2. Papers accommodated in the paper feeding tray 5 are conveyed one-by-one from the paper feeding tray 5 into the printer main body 2 by a paper conveyance unit (not shown in the diagram), and are conveyed toward the paper discharge tray 6 inside the printer main body 2. While the paper is conveyed inside the printer main body 2, an image is formed on the paper by the image forming unit 10. The paper (printed paper) having an image formed thereon is discharged to the paper discharge tray 6.

The scanner main body 3 is arranged at an upper side of the printer main body 2. A contact glass (not shown in the diagram) is placed on an upper surface of the scanner main body 3. An image reading unit 20 (refer to FIG. 2) is provided to be reciprocatable in the left-right direction inside the scanner main body 3. The image reading unit 20 includes components such as an LED (light emitting diode) light source, a lens, and an image sensor.

The ADF 4 is arranged at an upper side of the scanner main body 3. A rear-end portion of the ADF 4 is pivotably linked to the scanner main body 3. The ADF 4 is pivoted with the rear-end portion as a point of support between an operable position at which the ADF 4 covers the upper surface of the scanner main body 3 and an inoperable position at which a front side of the ADF 4 is lifted up with respect to the scanner main body 3. In a state that the ADF 4 is positioned at the operable position, an original is conveyed on a contact glass and is read by the image reading unit 20. In a state that the ADF 4 is positioned at the inoperable position, the contact glass is exposed, and an original can be placed on the contact glass which is exposed.

At the time of reading an image on an original by an ADF method, the image reading unit 20 is stopped at a predetermined position. When the original conveyed by the ADF 4 passes over the contact glass, light is irradiated to the original from the image reading unit 20. An image formed on the original is read by receiving the light reflected from the original by the image sensor of the image reading unit 20.

At the time of reading an image by a flat-bed method, an original is placed on the contact glass. Light is irradiated to the original from the image reading unit 20 which moves at a constant velocity, and the image formed on the original is read by receiving the light reflected from the original by the image sensor of the image reading unit 20.

Moreover, the MFP 1 includes the operation panel 7. The operation panel 7 is arranged at, for example, a front-end portion of the scanner main body 3. The operation panel 7 is provided with a display unit 30, an operating unit 40, and a NFC (near field communication) unit 50.

The display unit 30, for instance, includes a liquid-crystal display. Information of various types is displayed on the display unit 30.

The operating unit 40 includes various operation buttons. A user is capable of making various inputs by pushing the operation buttons. The operation buttons include an OK button for confirming various instructions (such as an instruction to start image processing), a cancel button for cancelling various instructions, a cross button for selecting a key to be displayed on the display unit 30, and a numeric keypad for inputting numbers and characters.

The NFC unit 50 as an example of an authentication-information input unit is capable of carrying out a two-way wireless communication between non-contact IC cards such as an ID card 90.

<Electrical Configuration>

Figure 2:
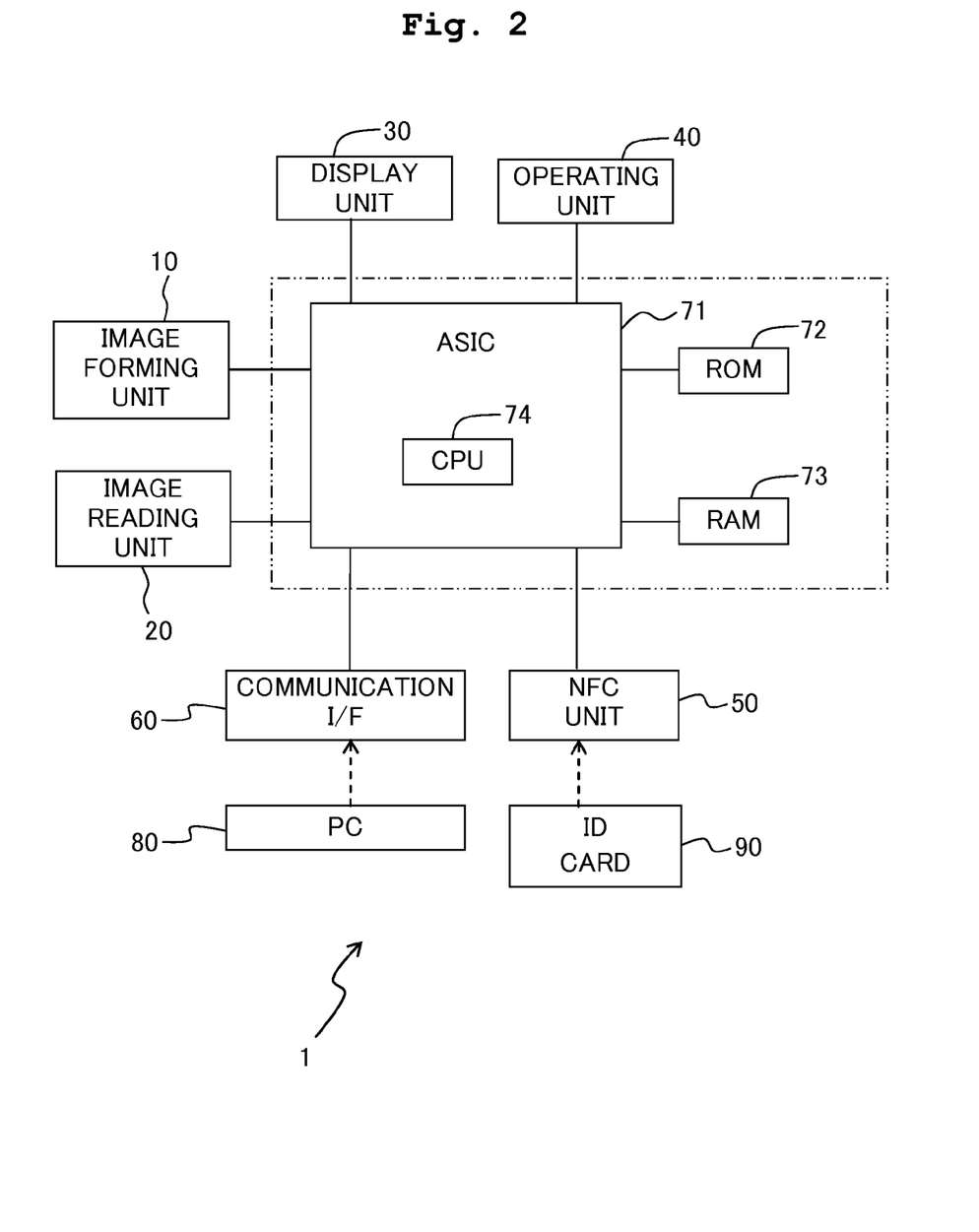
FIG. 2 is a block diagram depicting an electrical configuration of the MFP.

The MFP 1, as depicted in FIG. 2, includes a communication interface (I/F) 60.

The communication interface 60 is an interface for communicating with an external device such as a PC (personal computer) connected to a LAN (local area network). A method of communication may be a wireless communication method or a wired communication method.

Moreover, the MFP 1 includes an ASIC (application specific integrated circuit) 71 as an example of a controller, a ROM (read only memory) 72, and a RAM (random access memory) 73.

The ASIC 71 has a built-in CPU (central processing unit) 74. Instructions inputted via the operating unit 40 and identification information read from an ID card 90 by the NFC unit 50 are inputted to the ASIC 71. Moreover, a print job that has been transmitted from an external device is inputted to the ASIC 71 via the communication interface 60. In FIG. 2, a PC (personal computer) 80 is depicted as an example of the external device. The CPU 74 executes computer programs for various processing based on information inputted to the ASIC 71. By doing this, the CPU 74 controls the image forming unit 10, the image reading unit 20, and the display unit 30, and controls communication via the communication interface 60.

In the following description, a case, in which a print job transmitted from the PC 80 is received by the MFP 1, will be explained as an example.

Computer programs to be executed by the CPU 74 and various data are stored in the ROM 72.

The RAM 73 as an example of a storage unit is used as a work area when the CPU 74 executes a computer program.

<Print Job Execution Process>

Figure 3A:
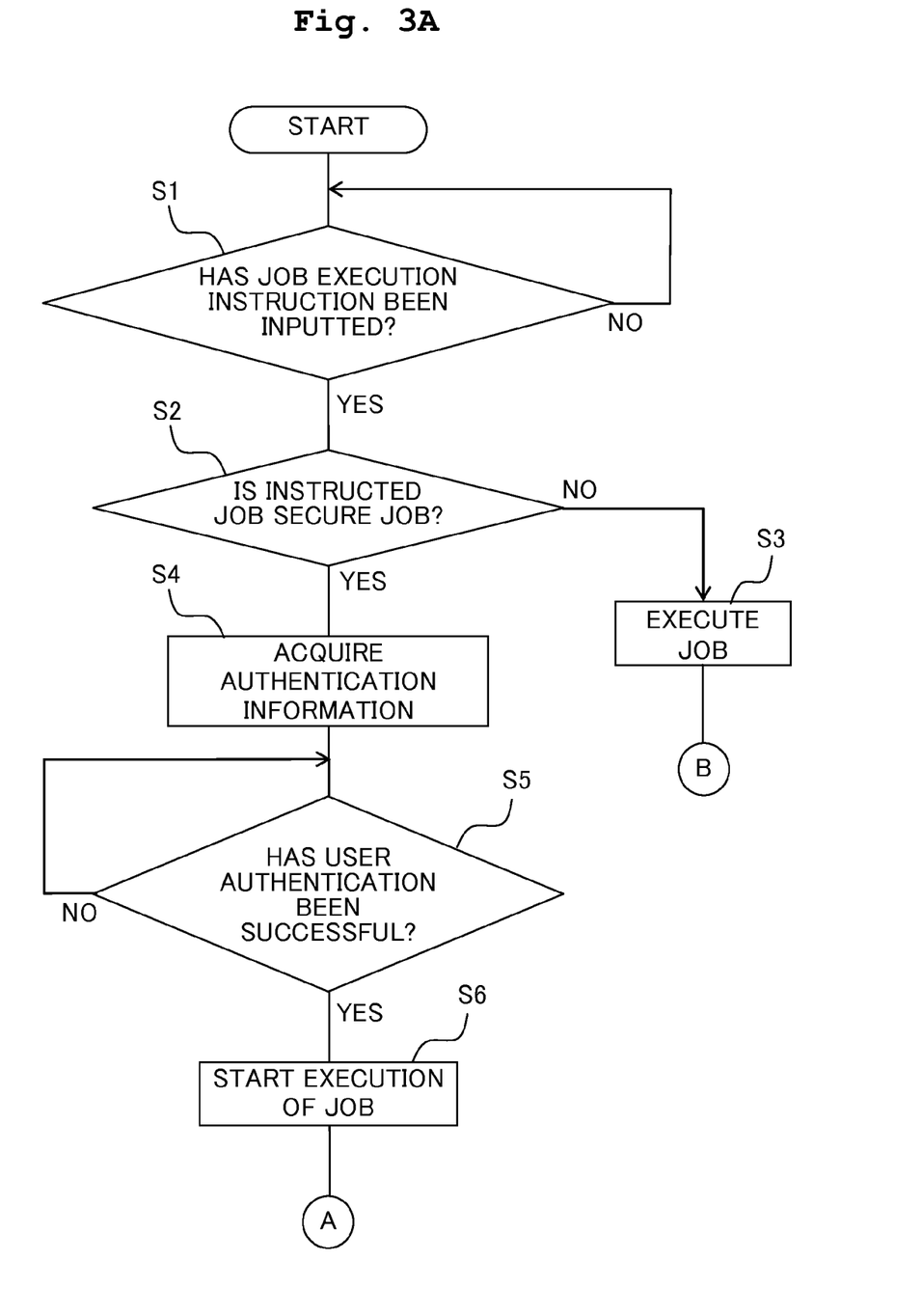
FIGS. 3A to 3C are flowcharts depicting a print job execution process.
Figure 3B:
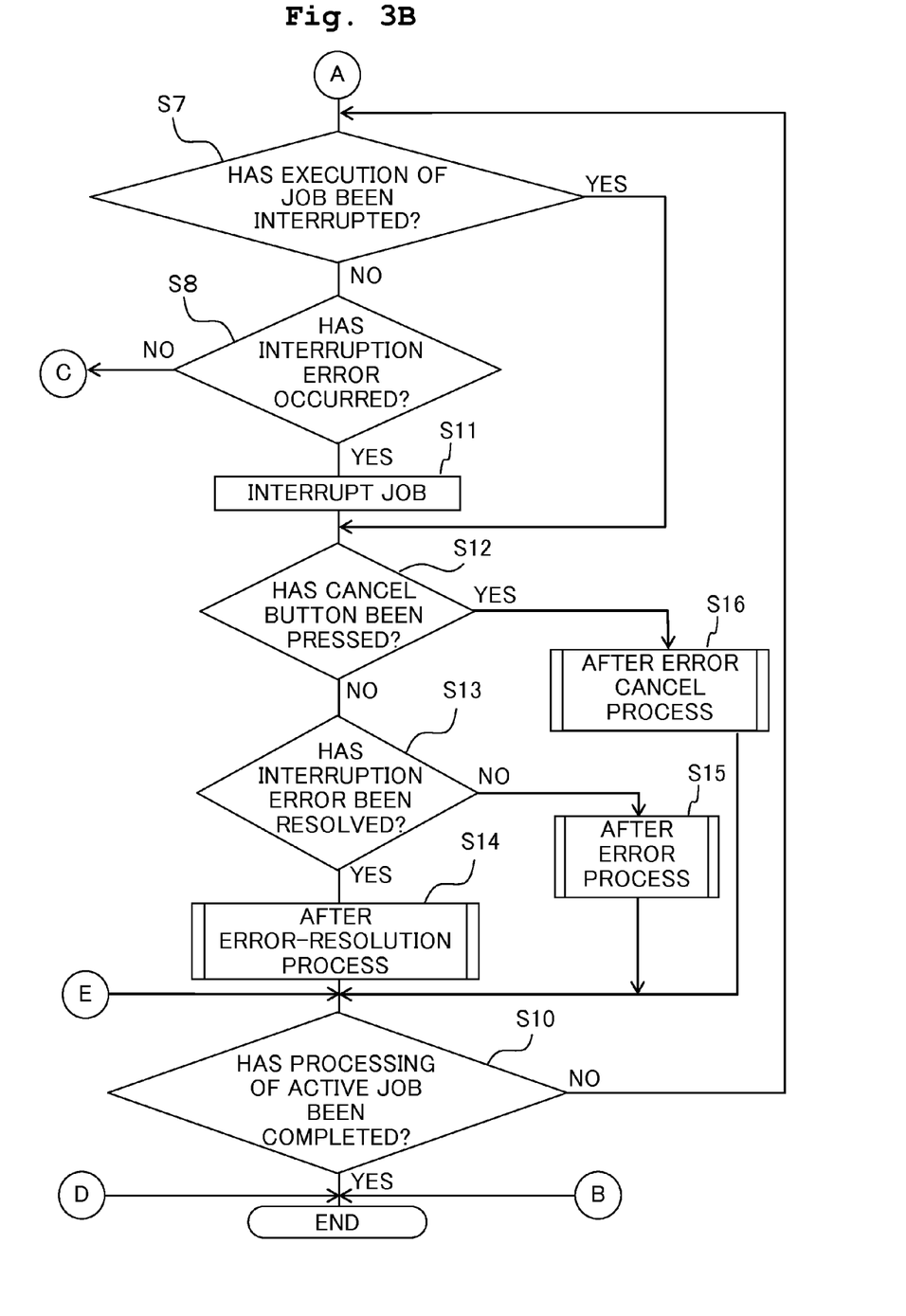
Figure 3C:
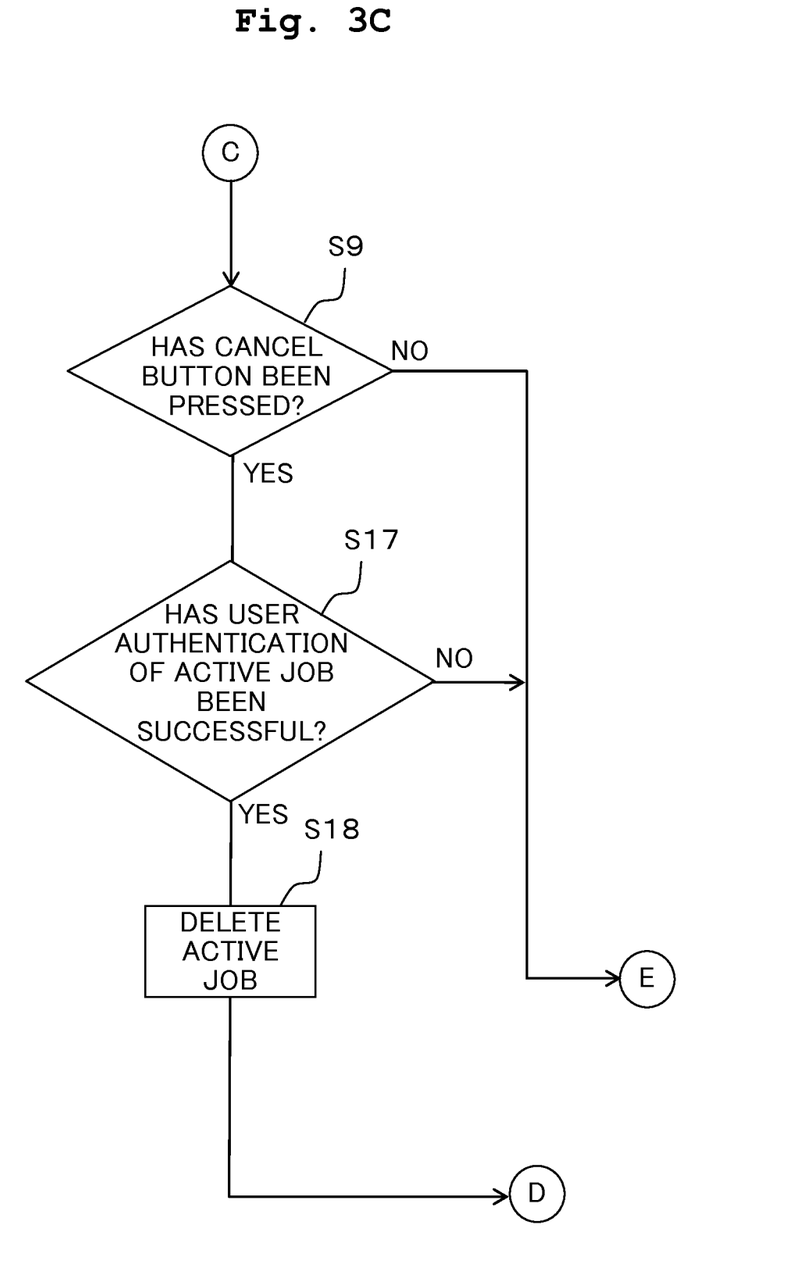

While an electric power supply to the MFP 1 is ON, the CPU 74 of the ASIC 71 repeats a print job execution process depicted in FIGS. 3A to 3C.

In the print job execution process, the CPU 74 judges whether or not a print job execution instruction has been inputted (step S1). The print job execution instruction may be inputted by a user via the operating unit 40, or may be inputted to the MFP 1 from the PC 80, after the print job transmitted from the PC 80 has been received.

As the MFP 1 receives the print job, the CPU 74 stores the print job in the RAM 73. The print job includes image data. In a case that the print job is a secure print job (hereinafter, referred to as "secure job"), authentication information (such as a user ID of a user who has transmitted the secure job) is accompanied with that secure job. In a case that the MFP 1 has received the secure job, the CPU 74 stores the secure job in the RAM 73 upon associating with the authentication information accompanied with the job.

In a case that the print job execution instruction has not been inputted (NO at step S1), the CPU 74 waits for an input of the print job execution instruction.

As the print job execution instruction is inputted (YES at step S1), the CPU 74 judges whether or not the print job that is to be executed is a secure job (step S2). It is possible to judge whether or not the print job is a secure job by judging whether or not the authentication information has been stored in the RAM 73 upon being associated with the print job. In other words, in a case that the print job to be executed has been stored in the RAM 73 upon being associated with the authentication information, it is possible to judge that the print job is a secure job. Whereas, in a case in which the print job to be executed has been stored in the RAM 73 without being associated with the authentication information, it is possible to judge that the print job is a normal print job (a print job which is not a secure job).

In a case that the print job to be executed is not a secure job (NO at step S2), the CPU 74 executes the print job to be executed (step S3), and terminates the print job execution process. The execution of the print job means that the CPU 74 controls the image forming unit 10 based on the image data included in the print job to form an image corresponding to the image data (image corresponding to the print job) on a paper.

In a case that the print job to be executed is a secure job (YES at step S2), the CPU 74 urges the user to input authentication information (an example of first authentication information) via the display unit 30, and acquires the authentication information which is inputted by the user (step S4). For inputting the authentication information, the user brings user's ID card 90 for example, closer to the NFC unit 50. As the ID card 90 is brought closer to the NFC unit 50, the authentication information (such as user ID) is read from the ID card 90 by the NFC unit 50. Moreover, the authentication information is acquired when the read authentication information that is inputted to the ASIC 71.

Thereafter, the CPU 74 judges whether or not user authentication has been successful (step S5). In other words, the CPU 74 judges whether or not the authentication information read from the ID card 90 matches the authentication information that has been associated with the secure job. If the read authentication information matches the authentication information associated with the secure job, the CPU 74 judges that the user authentication is successful (YES at step S5), and if the read authentication information does not match the authentication information associated with the secure job, the CPU 74 judges that the user authentication is not successful (has failed) (NO at step S5).

The CPU 74 repeatedly makes the judgment of whether or not the user authentication has been successful until the user authentication is successful.

As the user authentication is successful (YES at step S5), the CPU 74 starts execution of the secure job (step S6).

After the CPU 74 has started the execution of the secure job, the CPU 74 judges whether or not the execution of the secure job has been suspended (step S7).

In a case that the execution of the secure job has not been suspended (NO at step S7), in other words, in a case that the secure job is being executed, the CPU 74 judges whether or not a suspend error in which an operation of image formation by the image forming unit 10 is suspended forcibly has occurred (step S8).

The following situations can be cited as a suspend error.
(1) Consumables (such as toner and ink) have run down.
(2) No paper is accommodated in the paper feeding tray 5.
(3) Image data of the secure job has been corrupted or missing.
(4) Paper size not supported by the MFP 1 has been specified.
(5) The secure job is a job which designates double-sided printing, but the MFP 1 does not support double-sided printing.
(6) Jamming of paper.

In a case that no suspend error has not occurred (NO at step S8), the CPU 74 judges whether or not the cancel button of the operating unit 40 has been pressed (step S9).

In a case that the cancel button has not been pressed (NO at step S9), the CPU 74 judges whether or not the secure job has been completed (step S10).

In a case that the secure job has not been completed (NO at step S10), the CPU 74 once again judges whether or not the execution of the secure job has been suspended (step S7).

The execution of the secure job is continued until either a suspend error occurs or the cancel button has been pressed. As the secure job is completed (YES at step S10), the CPU 74 terminates the print job execution process.

In a case that a suspend error has occurred during the execution of the secure job (YES at step S8), the CPU 74 suspends the operation of image formation by the image forming unit 10 in response to the occurrence of the suspend error. Due to the interruption of the operation of image formation, the execution of the secure job is suspended inevitably (step S11).

After the interruption of execution of the secure job, the CPU 74 judges whether or not the cancel button of the operating unit 40 has been pressed (step S12).

In a case that the cancel button has not been pressed (NO at step S12), the CPU 74 judges whether or not the suspend error has been resolved (step S13).

In a case that the suspend error has been resolved (YES at step S13), the CPU 74 executes an after error-resolution process (step S14). The after error-resolution process will be described later.

In a case that the suspend error has not been resolved (NO at step S13), the CPU 74 executes an after error process (step S15). The after error process will be described later.

In a case that the cancel button has been pressed after the interruption of execution of the secure job (YES at step S12), the CPU 74 executes an "after error cancel process" (step S16). The "after error cancel process" will be described later.

After execution of the "after error-resolution process", the "after error process", or the "after error cancel process", the CPU 74 judges whether or not the secure job has been completed (step S10). In a case that the secure job has not been completed (NO at step S10), the CPU 74 executes processing from the processing at aforementioned step S7 onward.

Moreover, in a case that the cancel button has been pressed in a state in which no suspend error has occurred (NO at step S8 and YES at step S9), the CPU 74 urges the user who has pressed the cancel button to input the authentication information via the display unit 30. As the authentication information is inputted, the CPU 74 judges whether or not the inputted authentication information matches the authentication information that has been associated with the active secure job. If the inputted authentication information matches the authentication information associated with the active secure job, the CPU 74 judges that the user authentication has been successful (YES at step S17), and deletes the active secure job (step S18), and terminates the print job execution process.

In a case that the user authentication has been failed (NO at step s17), the CPU 74 judges whether or not the secure job has completed without deleting the active secure job (step S10). In a case that the secure job has not been completed (NO at step S10), the CPU 74 carries out processing from the processing at aforementioned step S7 onward.

<After Error-Resolution Process>

Figure 4:
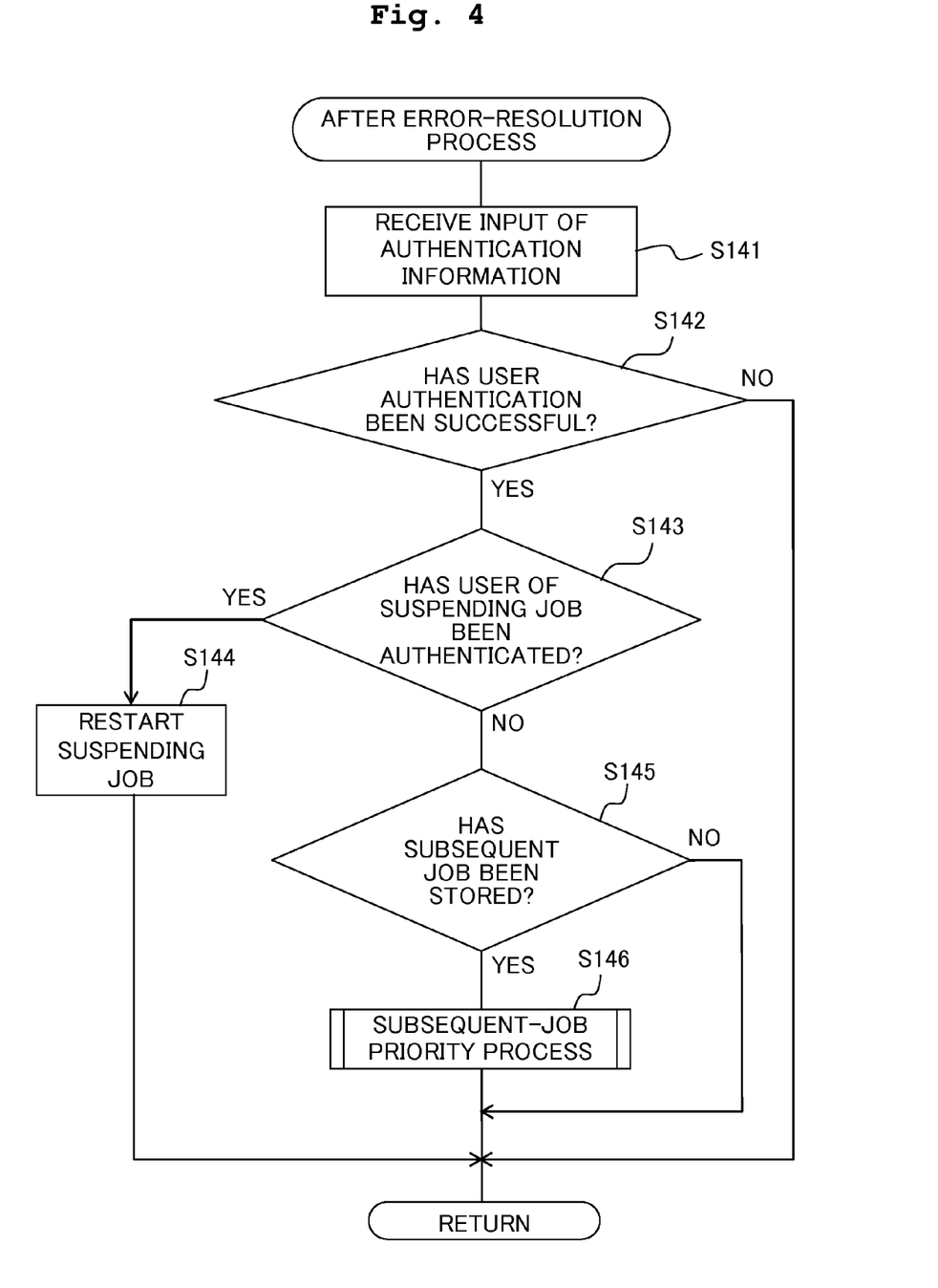
FIG. 4 is a flowchart depicting an after error-resolution process.

The "after error-resolution process" which is executed at step S14 in FIG. 3B will be described below while referring to FIG. 4.

In the "after error-resolution process", the CPU 74 receives an input of the authentication information (an example of second authentication information) from the NFC unit 50 (step S141).

After the CPU 74 has received the input of the authentication information, the CPU 74 carries out user authentication. A user management table is used for the user authentication. The user management table is stored in a memory such as a NVRAM (non-volatile RAM) which is not depicted in the diagram. Authentication information (such as a user ID) of each user who has been authorized to use the MFP 1 is stored in the user management table. In user authentication, the CPU 74 judges whether or not the inputted authentication information inputted by a user exists in the user management table, and if the inputted authentication information exists in the user management table, the CPU 74 judges that the user authentication has succeeded (YES at step S142).

In a case that the user authentication has been failed, or in other words, in a case that the inputted authentication information does not exist in the user management table (NO at step S142), the CPU 74 terminates the "after error-resolution process".

In a case that the user authentication has been successful (YES at step S142), the CPU 74 judges whether or not the authentication information which was authenticated matches the authentication information that has been associated with the secure job which has been suspended (hereinafter, called as a "suspending job") (step S143).

In a case that the authentication information which was authenticated matches the authentication information of the suspending job (YES at step S143), since the suspend error has already been resolved, the CPU 74 restarts execution of the suspending job (step S144), and terminates the "after error-resolution process".

In a case that the authentication information which was authenticated does not match the authentication information of the suspending job (NO at step S143), in other words, in a case that the user who has inputted the authentication information is different from a user who has transmitted the secure job, the CPU 74 judges whether or not a secure job which has been associated with the authenticated authentication information (hereinafter referred to as a "subsequent job". An example of another secure job) is stored in the RAM 73. In other words, the CPU 74 judges whether or not the authentication information which was authenticated matches the authentication information associated with the secure job that has been stored in the RAM 73.

In a case that the subsequent job is stored in the RAM 73 (YES at step S145), the CPU 74 executes a subsequent job priority process (step S146), and terminates the "after error-resolution process". The subsequent job priority process will be described later.

In a case that the subsequent job is not stored in the RAM 73 (NO at step S145), the CPU 74 terminates the "after error-resolution process" without executing the "subsequent job priority process". In this case, since the suspend error has already been resolved, the print job execution process depicted in FIG. 3B is continued in a state that the suspending job is being suspended.

<After Error Process>

Figure 5:
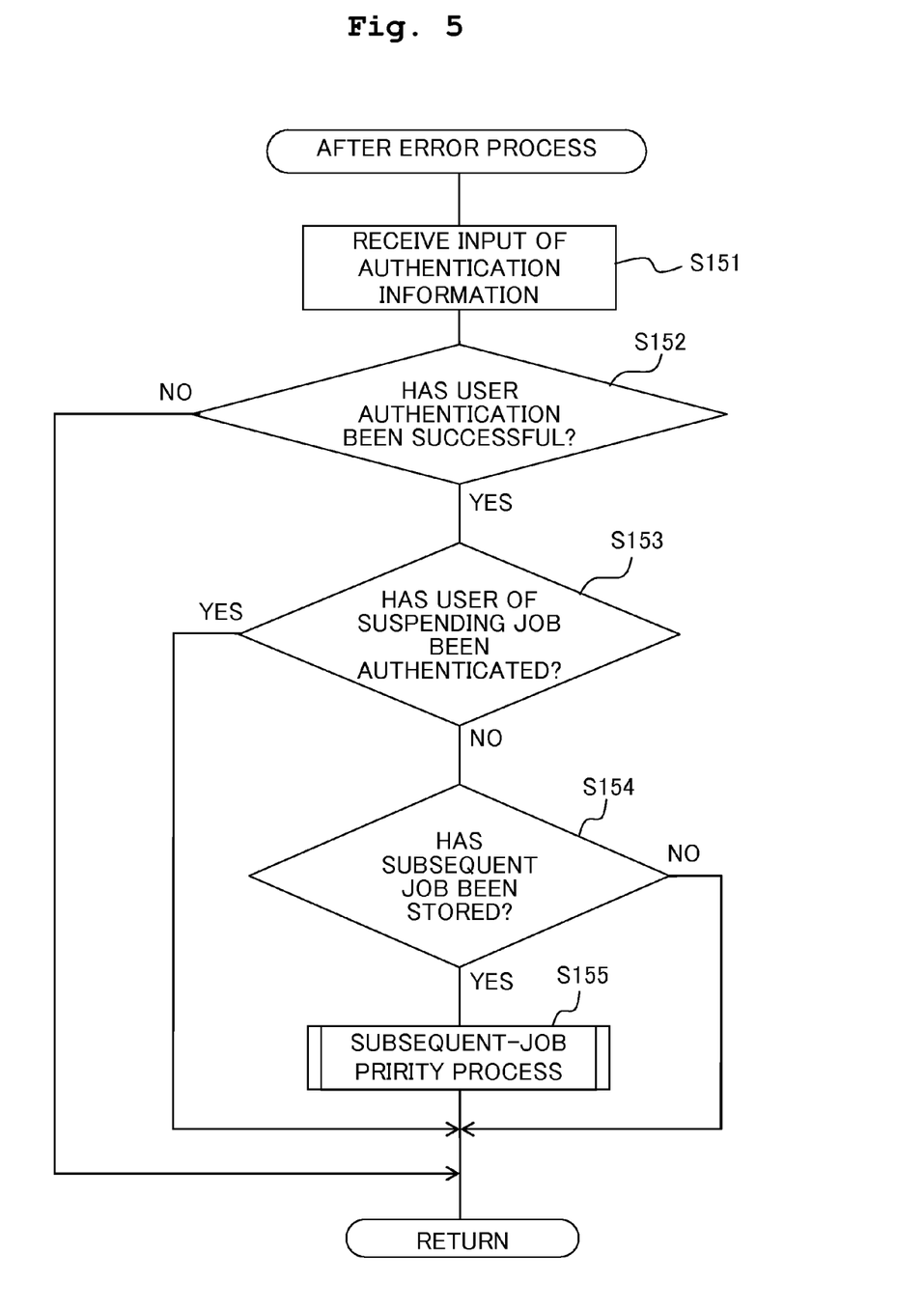
FIG. 5 is a flowchart depicting an after error process.

The "after error process" which is carried out at step S15 in FIG. 3B will be described below while referring to FIG. 5.

In the "after error process", the CPU 74 receives an input of the authentication information from the NFC unit 50 (step S151).

Thereafter, the CPU 74 judges whether or not the user authentication has succeeded (step S152). This judgment processing is a judgment processing similar to the judgment processing at step S142 in FIG. 4. In other words, as the CPU 74 receives the input of the authentication information, the CPU 74 judges whether or not the inputted authentication information exists in the user management table, and if the inputted authentication information exists in the user management table, the CPU 74 judges that the user authentication has succeeded (YES at step S152).

In a case that the user authentication has been failed (NO at step S152), the CPU 74 terminates the "after error process".

In a case that the user authentication has been successful (YES at step S152), the CPU 74 judges whether or not the authenticated authentication information matches the authentication information that has been associated with the suspending job (step S153).

In a case that the authenticated authentication information matches the authentication information of the suspending job (YES at step S153), the CPU 74 terminates the "after error process".

In a case that the authenticated authentication information does not match the authentication information of the suspending job (NO at step S153), the CPU 74 judges whether or not the subsequent job exists in the print jobs that have been stored in the RAM 73 (step S154). This judgment processing is a judgment processing similar to the judgment processing at step S145 in FIG. 4.

In a case that the subsequent job exists (YES at step S154), the CPU 74 executes the "subsequent-job priority process" (step S155), and terminates the "after error process". The "subsequent-job priority process" will be described later.

In a case that the subsequent job does not exist (NO at step S154), the CPU 74 terminates the "after error process" without executing the "subsequent job priority process".

<After Error Cancel Process>

Figure 6:
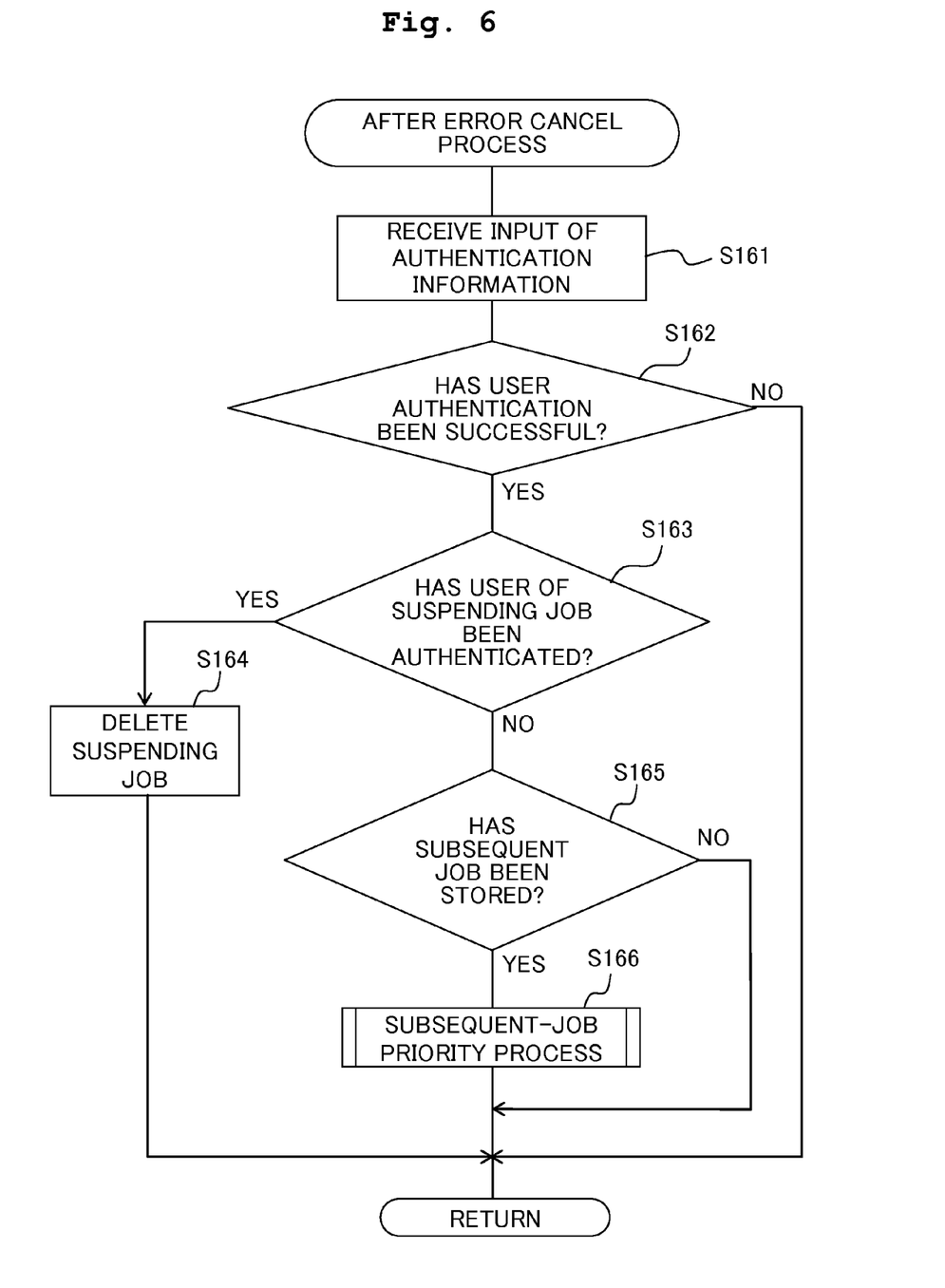
FIG. 6 is a flowchart depicting an after error cancel process.

The "after error cancel process" carried out at step S16 in FIG. 3B will be described below while referring to FIG. 6.

In the "after error cancel process", the CPU 74 receives an input of the authentication information via the NFC unit 50 (step S161).

Thereafter, the CPU 74 judges whether or not the user authentication has succeeded (step S162). The judgment processing is a judgment processing similar to the judgment processing at step S142 in FIG. 4. In other words, as the CPU 74 receives the input, the CPU 74 judges whether or not the inputted authentication information exists in the user management table, and if the inputted authentication information exists in the user management table, the CPU 74 judges that the user authentication has been successful (YES at step S162).

In a case that the user authentication has been failed (NO at step S162), the CPU 74 terminates the "after error cancel process".

In a case that the user authentication has been successful (YES at step S162), the CPU 74 judges whether or not the authenticated authentication information matches the authentication information that has been associated with the suspending job (step S163).

In a case that the authenticated authentication information matches the authentication information of the suspending job (YES at step S163), the CPU 74 deletes the suspending job from the RAM 73 (step S164), and terminates the "after error cancel process".

In a case that the authenticated authentication information does not match the authentication information of the suspending job (NO at step S163), the CPU 74 judges whether or not the subsequent job exists in the print jobs that have been stored in the RAM 73. This judgment processing is a judgment processing similar to the judgment processing at step S145.

In a case that the subsequent job does exist (YES at step S165), the CPU 74 executes the "subsequent-job priority process" (step S166), and terminates the "after error cancel process". The "subsequent-job priority process" will be described later.

In a case that the subsequent job does not exist (NO at step S165), the CPU 74 terminates the "after error cancel process" without executing the "subsequent-job priority process".

<Subsequent-Job Priority Process>

Figure 7:
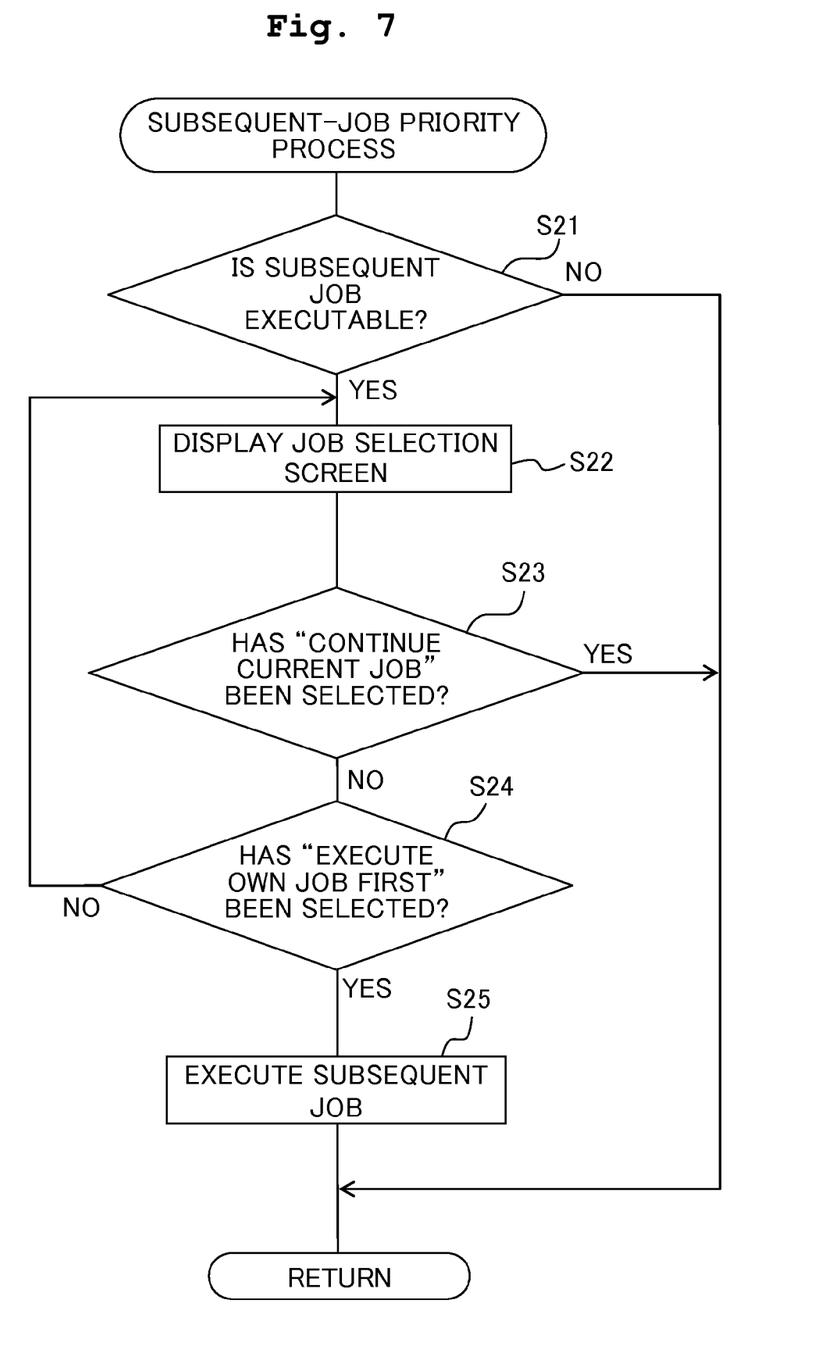
FIG. 7 is a flowchart depicting a subsequent-job priority process.

The "subsequent-job priority process" executed at step S146 in FIG. 4, step S155 in FIG. 5, and step S166 in FIG. 6 will be described below while referring to FIG. 7.

In the "subsequent job priority process", the CPU 74 judges whether or not the subsequent job is executable (step S21). Cases in which the subsequent job is executable include not only a case in which an error has been resolved, but also a case in which the subsequent job is executable, although the suspending job cannot be restarted because the current error has not been resolved.

The following cases can be cited as an example of the case in which the subsequent job is executable even if the current error has not been resolved.

(1) A case in which the suspending job is a color printing job and the subsequent job is a black-and-white printing job, and consumables for color printing (such as a color toner) have run down.

(2) A case in which the paper feeding tray 5 specified by the suspending job is empty, and another paper feeding tray (not shown in the diagram, an example of a second paper accommodating unit), that is different from the paper feeding tray 5, has been specified by the subsequent job, and papers are accommodated in the another paper feeding tray.

(3) A case in which image data of the suspending job has been corrupted or missing.

(4) A case in which a paper size that has been specified by the suspending job is a paper size which is not supported by the MFP 1, and a paper size specified by the subsequent job is a paper size which is supported by the MFP 1.

(5) A case in which double-sided printing has been specified by the suspending job, but the MFP 1 does not support the double-sided printing.

In a case that the subsequent job is not executable (NO at step S21), the CPU 74 terminates the "subsequent-job priority process".

In a case that the subsequent job is executable (YES at step S21), the CPU 74 controls the display unit 30 to display a job selection screen on the display unit 30 (step S22).

Two character strings, namely, "continue current job" and "carry out own job first" for example are displayed in two stages namely an upper stage and a lower stage, on the job selection screen. It is possible to select one of the character strings by operation of an upward-direction button or a downward-direction button of the cross button of the operating unit 40.

As the OK button of the operating unit 40 is pressed in a state of the "continue current job" being selected, the CPU 74 judges that "continue current job" has been selected (YES at step S23). In this case, the interruption of the suspending job is kept, the following processing is not carried out, and the "subsequent job priority process" is terminated.

Whereas, as the OK button of the operating unit 40 is pressed in a state of "carry out own job first" being selected, the CPU 74 judges that "carry out own job first" has been selected (YES at step S24).

In a case that "carry out own job first" is selected, the CPU 74 executes the subsequent job (step S25) while keeping interruption of the suspending job, and terminates the "subsequent job priority process".

The job selection screen is continued to be displayed on the display unit 30 until the OK button of the operating unit 40 is pressed in a state that "continue current job" or "carry out own job first" is selected.

[Action and Effect]

In such manner, as the execution of the secure job is suspended, a state in which the input of the authentication information is possible is provided. Moreover, in a case that the authentication information that has been inputted while the execution of the secure job is suspended matches at least one of the authentication information of the print jobs that have been stored in the RAM 73 (the subsequent job exists in the print jobs that have been stored in the RAM 73), and the subsequent job is executable, it is possible to execute the subsequent job prior to the suspending job.

In the MFP 1, in a case that the subsequent job exists in the print jobs that have been stored in the RAM 73, and the subsequent job is executable, it is possible to select "continue the current job" or "carry out own job first". In a case that "continue the current job" is selected, or in other words, in a case that the suspending job is selected, the interruption of the secure job is retained without executing the subsequent job. Whereas, in a case that "carry out own job first" is selected, or in other words, in a case that the subsequent job has been selected, the subsequent job is executed prior to the suspending job.

For instance, in a case that the secure job has been suspended due to an error that no paper is accommodated in the paper feeding tray 5, and it is possible to supply papers to be used for the subsequent job to the image forming unit 10 from another tray other than the paper feeding tray 5, the subsequent job is executable even if the error is not resolved.

Moreover, in a case that the secure job has been suspended due to an error that a size of the papers accommodated in the paper feeding tray 5 is different from a size to be used for the secure job, and the size of the papers accommodated in the paper feeding tray 5 is the same as a size to be used for the subsequent job, the subsequent job is executable even if the error is not resolved.

Furthermore, in a case that an error, which caused interruption of the secure job, has been resolved, and the authentication information that has been inputted during the interruption of the secure job matches the authentication information which has been associated with the secure job, the execution of the secure job (in other words, the suspending job) is restarted.

Conversely, even if the error which caused the interruption has been resolved after the secure job has been interrupted, in a case that the authentication information that was inputted during the interruption does not match the authentication information which has been associated with the secure job, the execution of the secure job (in other words, the suspending job) is not restarted. Therefore, in a case that a user different from the user of the suspending job has resolved the error, it is possible to prevent the content of the suspending job from being known to the user who has resolved the error. As a result, it is possible to improve confidentiality.

Moreover, in a case that the error has been resolved, and the authentication information that was inputted during the interruption of the secure job matches the authentication information of the subsequent job, the subsequent job is executed. Accordingly, in a case that the error which caused the interruption has been resolved after the interruption of the secure job, it is possible to execute the subsequent job prior to the suspending job.

In a case that an instruction to cancel the secure job has been given during the interruption of the secure job, and the authentication information that was inputted during the interruption of the secure job matches the authentication information which has been associated with the secure job, the secure job (namely, the suspending job) is deleted. Accordingly, it is possible to prevent the secure job from being deleted by a user different from the user of the secure job.

Modified Examples

The embodiment of the present teaching has been described heretofore. It is also possible to put the present teaching into effect in other embodiments.

For instance, in the aforementioned embodiment, as the user's ID card 90 is brought closer to the NFC unit 50, the authentication information (user ID and password for user authentication) is read from the ID card 90 by the NFC unit 50, and the read authentication information is inputted to the ASIC 71. Without restricting to such an arrangement, the user may input the user ID and the password for user authentication by operating the operating unit 40.

Moreover, in a case that an error has occurred during execution of the subsequent job, it is preferable to execute each processing explained in the aforementioned embodiment for the subsequent job. Accordingly, even in a case that the subsequent job is suspended due to an error, it is possible to execute another subsequent job.

Moreover, in the aforementioned embodiment, although six cases have been cited as examples of a case in which the subsequent job is executable even if the current error is not resolved, each of the cases cited is an example of a case in which both the suspending job and the subsequent job are print jobs. Jobs which can be executed by the MFP 1 include jobs such as a reading job which uses the image reading unit 20 and a FAX (facsimile) job which uses the communication interface 60, other than the printing job. In a case in which these jobs are executed in combination, other than the aforementioned six cases, the following cases can be exemplified as a case in which the subsequent job is executable even if the current error is not resolved.

(1) A case in which a printing error occurred, and the subsequent job is a job which does not use the image forming unit 10 (such as a reading job and a FAX transmission job).

(2) A case in which an error occurred during reading of an image by the image reading unit 20, and the subsequent job is a job which does not use the image reading unit 20 (such as a print job and a FAX reception job).

In the aforementioned embodiment, a case in which the CPU 74 executes each processing has been described. However, the ASIC 71 may include a plurality of CPUs, and the plurality of CPUs may execute the processing in cooperation. ASIC 71 may have a processing circuit and each processing may be executed by the processing circuit based on an instruction from the CPU 74. Moreover, the CPU 74 may control a processing circuit provided outside of the ASIC 71 to execute each processing.

Moreover, in the aforementioned embodiment, the MFP 1 having a print function by the image forming unit 10 has been cited as an example of the image forming apparatus. However, the image forming apparatus may be a single-function apparatus such as a printing apparatus having a print function.

In the aforementioned arrangement, it is possible to make various design modifications which fall within a scope of the claims.

What is claimed is:

1. An image processing apparatus comprising:
an image forming unit;
an authentication-information input unit;
a storage unit including a memory; and
a controller,
wherein a plurality of secure jobs, which are classified and to be executed by the image forming unit, and
a plurality of authentication information associated with the plurality of secure jobs, respectively, are stored in the storage unit,
wherein each secure job can be automatically executed by the image forming unit only in a case that an authentication information inputted to the authentication-information input unit matches one of the plurality of authentication information which is stored in the storage unit and associated with the secure job, and
wherein the image processing apparatus has one or more processors and one or more memories, at least one of the one or more memories storing computer-readable instructions therein, the computer-readable instructions, when executed by the one or more processors, cause the controller to:
acquire first authentication information inputted to the authentication-information input unit;
in a case that the first authentication information matches an authentication information stored in the storage unit and associated with a first secure job which is a color printing job and stored in the storage unit, cause the image forming unit to execute the first secure job;
acquire second authentication information which is inputted to the authentication-information input unit and which is different from the first authentication information, while the first secure job is interrupted because consumables for color printing have run down;
if (a) the first secure job is still interrupted because the consumables for the color printing are not replenished,
(b) the second authentication information matches another authentication information stored in the storage unit and associated with a second secure job which is a black-and-white printing job and stored in the storage unit, and
(c) the second secure job is executable by the image forming unit because consumables for the black-and-white printing have not run down, then receive a selection of the first secure job corresponding to the first authentication information or the second secure job corresponding to the second authentication information, from a user who inputted the second authentication information;
in a case that the controller receives the selection of the first secure job, keep the interruption of the first secure job while not causing the image forming unit to execute the second secure job;
in a case that the controller receives the selection of the second secure job, keep the interruption of the first secure job and cause the image forming unit to execute the second secure job.

2. The image processing apparatus according to claim 1, wherein after the execution of the first secure job has been interrupted, the controller judges whether or not the consumables for the color printing are replenished, and only in a case that the controller judges that the consumables for the color printing are replenished and the second authentication information matches the authentication information associated with the first secure job which has been interrupted, the controller causes the image forming unit to restart execution of the first secure job which has been interrupted.

3. The image processing apparatus according to claim 2, wherein in a case that the controller judges that the consumables for the color printing are replenished, the second authentication information matches the another authentication information associated the controller keeps the interruption of execution of the first secure job which has been interrupted and causes the image forming unit to execute the second secure job.

4. The image processing apparatus according to claim 1, wherein the controller is further configured to:
receive a cancel instruction to cancel the first secure job; and
in a case that the cancel instruction has been received and the second authentication information matches the authentication information associated with the first secure job which has been interrupted, delete the first secure job which has been interrupted.

5. An image processing apparatus comprising:
an image forming unit;
an authentication-information input unit;
a first paper accommodating unit;
a second paper accommodating unit;
a storage unit including a memory; and
a controller,
wherein a plurality of secure jobs, which are classified and to be executed by the image forming unit, and a plurality of authentication information associated with the plurality of secure jobs, respectively, are stored in the storage unit,
wherein each secure job can be automatically executed by the image forming unit only in a case that an authentication information inputted to the authentication-information input unit matches one of the plurality of authentication information which is stored in the storage unit and associated with the secure job, and
wherein the image processing apparatus has one or more processors and one or more memories, at least one of the one or more memories storing computer-readable instructions therein, the computer-readable instructions, when executed by the one or more processors, cause the controller to:
acquire first authentication information inputted to the authentication-information input unit;
in a case that the first authentication information matches an authentication information stored in the storage unit and associated with a first secure job which specifies the first paper accommodating unit and is stored in the storage unit, cause the image forming unit to execute the first secure job;
acquire second authentication information which is inputted to the authentication information input unit and which is different from the first authentication information, while the first secure job is interrupted because the first paper accommodating unit is empty;
if (a) the first secure job is still interrupted because the first paper accommodating unit is still empty,
(b) the second authentication information matches another authentication information stored in the storage unit and associated with a second secure job which specifies the second paper accommodating unit and is stored in the storage unit, and
(c) the second secure job is executable by the image forming unit because the second paper accommodating unit is not empty, then receive a selection of the first secure job corresponding to the first authentication information or the second secure job corresponding to the second authentication information, from a user who inputted the second authentication information;
in a case that the controller receives the selection of the first secure job, keep the interruption of the first secure job while not causing the image forming unit to execute the second secure job;
in a case that the controller receives the selection of the second secure job, keep the interruption of the first secure job and cause the image forming unit to execute the second secure job.

6. An image processing apparatus comprising:
an image forming unit;
an authentication-information input unit;
a storage unit including a memory; and
a controller,
wherein a plurality of secure jobs, which are classified and to be executed by the image forming unit, and a plurality of authentication information associated with the plurality of secure jobs, respectively, are stored in the storage unit,
wherein each secure job can be automatically executed by the image forming unit only in a case that an authentication information inputted to the authentication-information input unit matches one of the plurality of authentication information which is stored in the storage unit and associated with the secure job, and
wherein the image processing apparatus has one or more processors and one or more memories, at least one of the one or more memories storing computer-readable instructions therein, the computer-readable instructions, when executed by the one or more processors, cause the controller to:
acquire first authentication information inputted to the authentication-information input unit;
in a case that the first authentication information matches an authentication information stored in the storage unit and associated with a first secure job which specifies a first paper size and stored in the storage unit, cause the image forming unit to execute the first secure job;
acquire second authentication information which is inputted to the authentication information input unit and which is different from the first authentication information, while the first secure job is interrupted because the first paper size is not supported by the image processing apparatus;
if (a) the first secure job is still interrupted because the first paper size is still specified by the first secure job, (b) the second authentication information matches another authentication information stored in the storage unit and associated with a second secure job which specifies a second paper size and is stored in the storage unit, and (c) the second secure job is executable by the image forming unit because the second paper size is supported by the image processing apparatus, then receive a selection of the first secure job corresponding to the first authentication information or the second secure job corresponding to the second authentication information, from a user who inputted the second authentication information;

in a case that the controller receives the selection of the first secure job, keep the interruption of the first secure job while not causing the image forming unit to execute the second secure job;

in a case that the controller receives the selection of the second secure job, keep the interruption of the first secure job and cause the image forming unit to execute the second secure job.

\* \* \* \* \*